United States Patent
Yamazaki (10) Patent No.: US 8,448,683 B2
(45) Date of Patent: May 28, 2013

(54) HEAVY DUTY PNEUMATIC TIRE

(75) Inventor: Kazumi Yamazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 377 days.

(21) Appl. No.: 12/846,354

(22) Filed: Jul. 29, 2010

(65) Prior Publication Data

US 2011/0056607 A1    Mar. 10, 2011

(30) Foreign Application Priority Data

Sep. 4, 2009 (JP) ................. 2009-205032

(51) Int. Cl.
*B60C 15/00* (2006.01)
*B60C 15/06* (2006.01)

(52) U.S. Cl.
USPC ........... 152/539; 152/540; 152/541; 152/542; 152/547; 152/555

(58) Field of Classification Search
USPC ............... 152/539, 540, 541, 542, 543, 546, 152/547, 555
See application file for complete search history.

(56) References Cited

U.S. PATENT DOCUMENTS

| | | | | |
|---|---|---|---|---|
| 4,966,216 A | * | 10/1990 | Kawasaki et al. | 152/556 |
| 7,165,586 B2 | * | 1/2007 | Westgate et al. | 152/451 |
| 7,604,032 B2 | | 10/2009 | Maruoka | |

FOREIGN PATENT DOCUMENTS

| | | | |
|---|---|---|---|
| JP | EP 1080950 | * | 3/2001 |
| JP | 2007-230400 A | | 9/2007 |

* cited by examiner

*Primary Examiner* — Justin Fischer
(74) *Attorney, Agent, or Firm* — Birch, Stewart, Kolasch & Birch, LLP (57) ABSTRACT

A heavy duty pneumatic tire comprises a carcass ply of steel cords turned up around a bead core in each bead portion so as to form a pair of turned up portions and a main portion therebetween. The steel cords of the carcass ply are rubberized with a topping rubber having a hardness $Ht1$ of from 68 to 90 degrees. The bead core is composed of: a bead core main made of windings of a steel wire; a rubber coating penetrating into the bead core main and having a hardness $Hb$ of from 78 to 90 degrees; and a bead core wrapping layer surrounding the bead core main and composed of at least one ply of parallel organic fiber cords rubberized with a topping rubber having a hardness $Ht2$ of from 70 to 90 degrees. The fineness of each of the organic fiber cords of the bead core wrapping layer is in a range of from 940 to 4200 dtex. The distances between the organic fiber cords of the bead core wrapping layer is in a range of from 0.3 to 1.4 mm. The organic fiber cords of the bead core wrapping layer are inclined at an angle $\alpha 1$ in a range of from 20 to 70 degrees with respect to the tire circumferential direction. A minimum distance between the carcass cords and the axially innermost winding of the steel wire of the bead core main is in a range of from 0.8 to 3.0 mm.

3 Claims, 6 Drawing Sheets

HEAVY DUTY PNEUMATIC TIRE

BACKGROUND OF THE INVENTION

The present invention relates to a heavy duty pneumatic tire, more particularly to a bead structure capable of preventing breakage of carcass cords occurring in the vicinity of the axially inner end of the bead core.

In general, heavy duty pneumatic tires for trucks, buses and the like are provided with a carcass reinforced by steel cords extending between bead portions and turned up around a bead core in each of the bead portions from the axially inside to the axially outside of the tire. The heavy duty pneumatic tires have a high probability of being used under extremely severe service conditions with heavy loads and very high tire inflation pressure. Therefore, there is a possibility that the steel carcass cords are broken in the vicinity of the bead core.

Conventionally, in order to prevent the carcass cords from being broken by direct contacts with the steel wire of the bead core, the bead core is wrapped with a high modulus rubber layer for example as disclosed in U.S. Pat. No. 7,604,032 and Japanese patent application publication No. 2007-230400A.

In recent years, on the other hand, in view of environment improvements, tire manufactures make great efforts to reduce tire weight even in the heavy duty pneumatic tires for trucks, buses and the like.

In order to reduce the tire weight, for example, the number of carcass ply is reduced to one (single ply), and the volume of rubber such as bead apex, reinforcing layer, filler etc. used in the bead portions is decreased as disclosed in U.S. Pat. No. 7,604,032.

As a result, the motion of the carcass ply during running is increased in the case of such a heavy duty pneumatic tire (hereinafter "heavy duty pneumatic tire with slim beads"). Therefore, it becomes difficult for the conventional high modulus rubber layer to fully prevent the carcass cords from contacting with the steel wire of the bead core, and thus it is difficult to provide bead durability.

SUMMARY OF THE INVENTION

It is therefore, an object of the present invention to provide a heavy duty pneumatic tire (especially with slim beads), in which breakages of carcass cords are effectively prevented, and bead durability can be improved.

According to the present invention, a heavy duty pneumatic tire comprises
a tread portion,
a pair of sidewall portions,
a pair of bead portions each with a bead core therein, and
a carcass ply of steel cords extending between the bead portions and turned up around the bead core in each said bead portion from the inside to the outside of the tire so as to form a pair of turned up portions and a main portion therebetween, wherein
the steel cords of the carcass ply are rubberized with a topping rubber having a hardness Ht1 of from 68 to 90 degrees,
the bead core is composed of
a bead core main made of windings of a steel wire,
a rubber coating penetrating into the bead core main and having
a hardness Hb of from 78 to 90 degrees, and
a bead core wrapping layer surrounding the bead core main and composed of at least one ply of parallel organic fiber cords rubberized with a topping rubber having a hardness Ht2 of from 70 to 90 degrees,
the fineness of each of the organic fiber cords of the bead core wrapping layer in a range of from 940 to 4200 dtex,
the distances between the organic fiber cords of the bead core wrapping layer are in a range of from 0.3 to 1.4 mm,
the organic fiber cords of the bead core wrapping layer are inclined at an angle $\alpha 1$ in a range of from 20 to 70 degrees with respect to the tire circumferential direction, and
a minimum distance between the carcass cords and the axially innermost winding of the steel wire of the bead core main is in a range of from 0.8 to 3.0 mm.

Therefore, the necessary distance between the steel carcass cords and the steel wire of the bead core can be maintained even under extremely severe service conditions, and breakage of the carcass cords can be effectively prevented and the bead durability is improved.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved for the tire by standard organization, i.e. JATMA (Japan and Asia), T&RA (North America), ETRTO (Europe), STRO (Scandinavia) and the like. The standard pressure is the maximum air pressure for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like.

The "hardness" of rubber means a hardness measured with a type-A durometer according to Japanese Industrial Standard K6253.

DESCRIPTION OF THE PREFERRED EMBODIMENTS

Embodiments of the present invention will now be described in detail in conjunction with the accompanying drawings.

Figure 1:
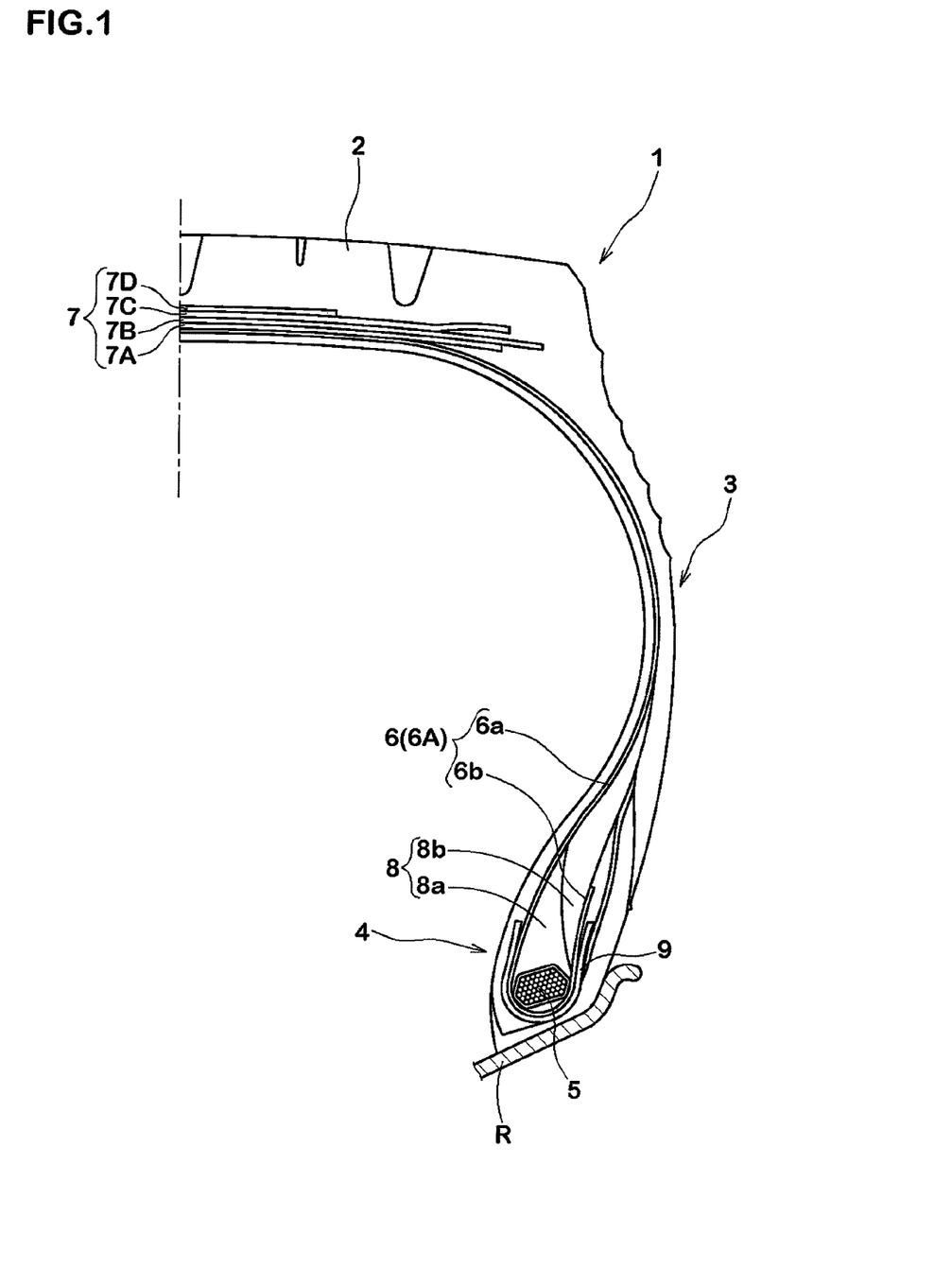
FIG. 1 is a cross sectional view of a heavy duty pneumatic tire according to the present invention.

In the drawings, a heavy duty pneumatic tire 1 according to the present invention comprises a tread portion 2, a pair of sidewall portions 3, a pair of axially spaced bead portions 4 each with a bead core 5 therein, a carcass 6 extending between the bead portions 4, and a tread reinforcing belt 7 disposed radially outside the carcass 6 in the tread portion 2.

The tread reinforcing belt 7 is composed of at least three plies, including at least two cross plies, each made of parallel steel cords.
In this embodiment, the belt 7 is composed of four plies: a radially innermost first ply 7A made of steel cords laid at an angle in a range of from 45 to 75 degrees with respect to the tire equator C; and radially outer second, third and fourth plies 7B, 7C and 7D each made of steel cords laid at an angle in a range of from 10 to 35 degrees with respect to the tire equator C.

The carcass 6 is composed of at least one ply 6A of steel carcass cords 6c arranged radially at an angle in the range of from 70 to 90 degrees with respect to the tire equator CO, extending between the bead portions 4 through the tread portion 2 and sidewall portions 3 and turned up around the bead core 5 in each bead portion 4 from the axially inside to the axially outside of the tire so as to form a pair of turnup portions 6b and a main portion 6a therebetween.
In this embodiment, the carcass 6 is composed of a single ply 6A of steel carcass cords arranged radially at an angle of 90 degrees with respect to the tire equator CO.

Figure 4:
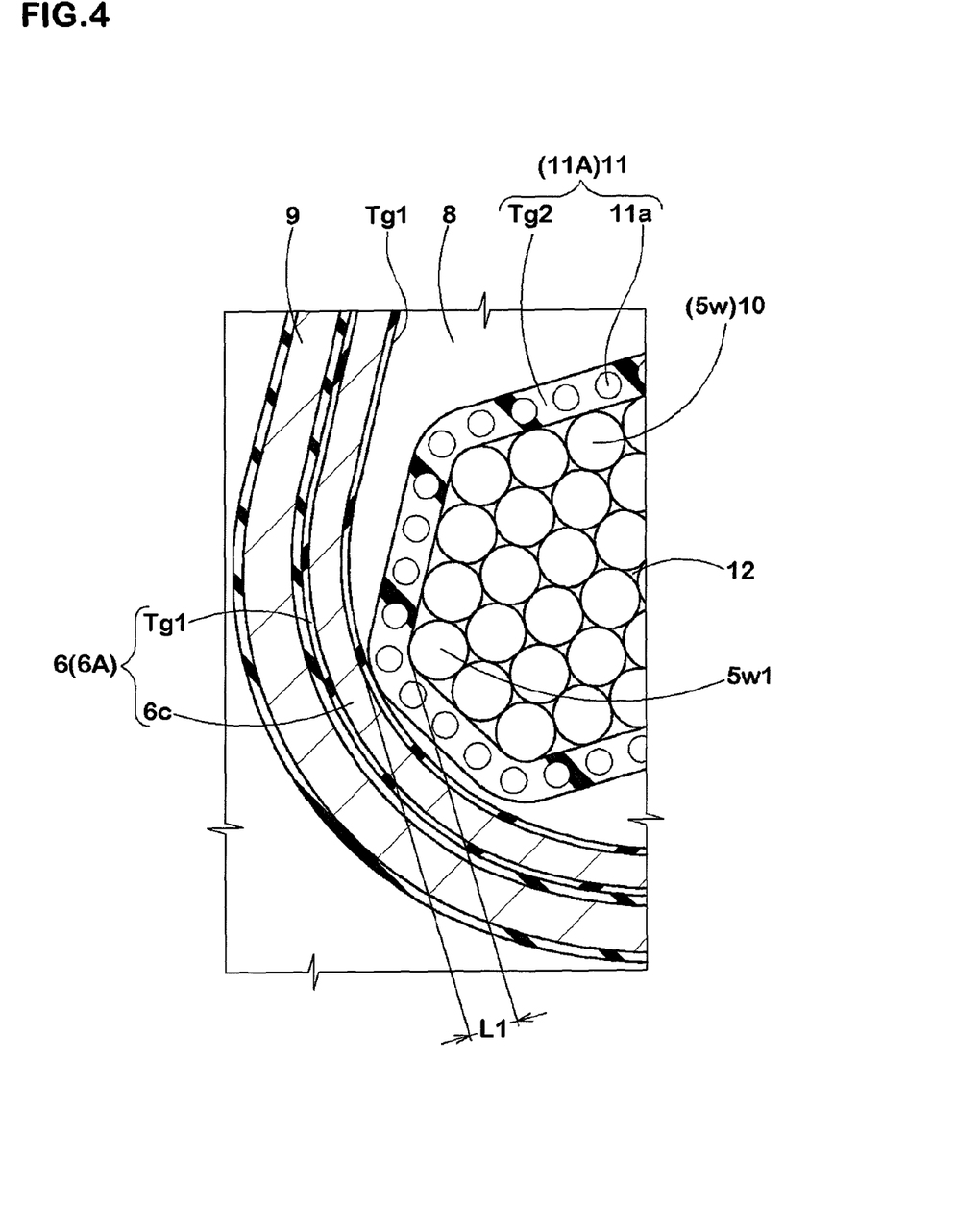
FIG. 4 is an enlarged cross sectional view showing the vicinity of the axially innermost end of the bead core thereof.

The carcass ply 6A is rubberized with topping rubber Tg1, and both sides of the carcass ply 6A are covered with the topping rubber Tg1 of a certain thickness as shown in FIG. 4.

The hardness Ht1 of the topping rubber Tg1 is set in a range of not less than 68 degrees, preferably not less than 70 degrees, but not more than 90 degrees, preferably not more than 88 degrees. If the hardness Ht1 is less than 68 degrees, the topping rubber tends to flow during tire vulcanization and the covering thickness of the topping rubber decreases. As a result, there is a possibility that the carcass cords are broken. If the hardness Ht1 is more than 90 degrees, there is a possibility of rubber burn during kneading the topping rubber materials.

Figure 2:
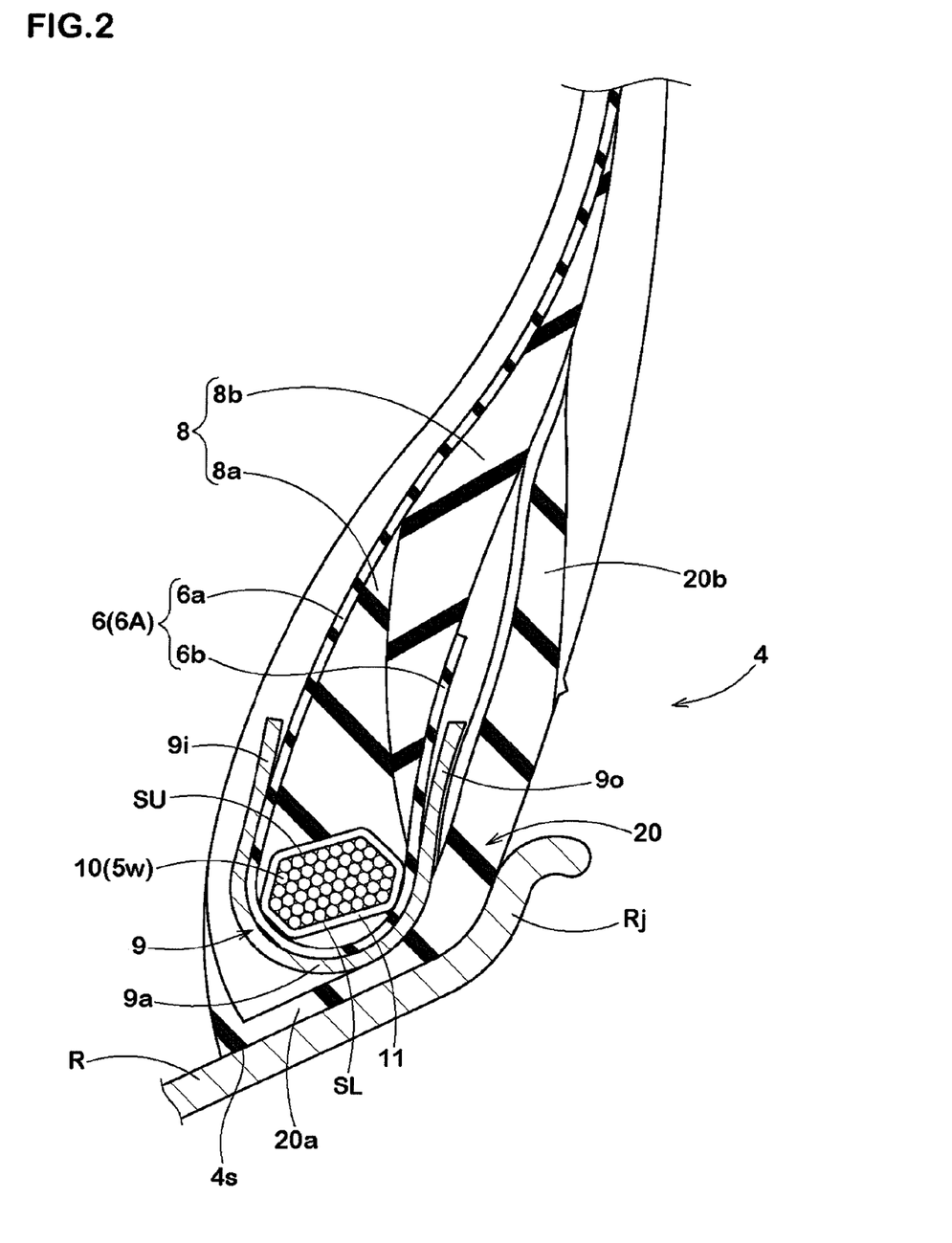
FIG. 2 is an enlarged cross sectional view of the bead portion thereof.

Each of the bead portions 4 is provided between the main portion 6a and turned up portion 6b with a bead apex 8 extending radially outwardly from the bead core 5 in a tapered manner in order to reinforce the bead portion.

The bead apex 8 in this embodiment is as shown in FIG. 2, composed of a radially inner apex 8a made of a hard rubber layer having a hardness Hs1 of from 80 to 95 degrees, and a radially outer apex 8b made of a rubber softer than the inner apex 8a. Preferably, the hardness Hs2 of the radially outer apex 8b is set in a range of from 50 to 65 degrees.
As a result, when the bead portion 4 is subjected to bending deformation, the bead apex 8 can provide a sufficient bending rigidity, while mitigating the share stress which the turned up portion 6b of the carcass ply 6A is subjected to. Thus, damages such as carcass ply separation failure and the like can be effectively prevented.

Figure 3:
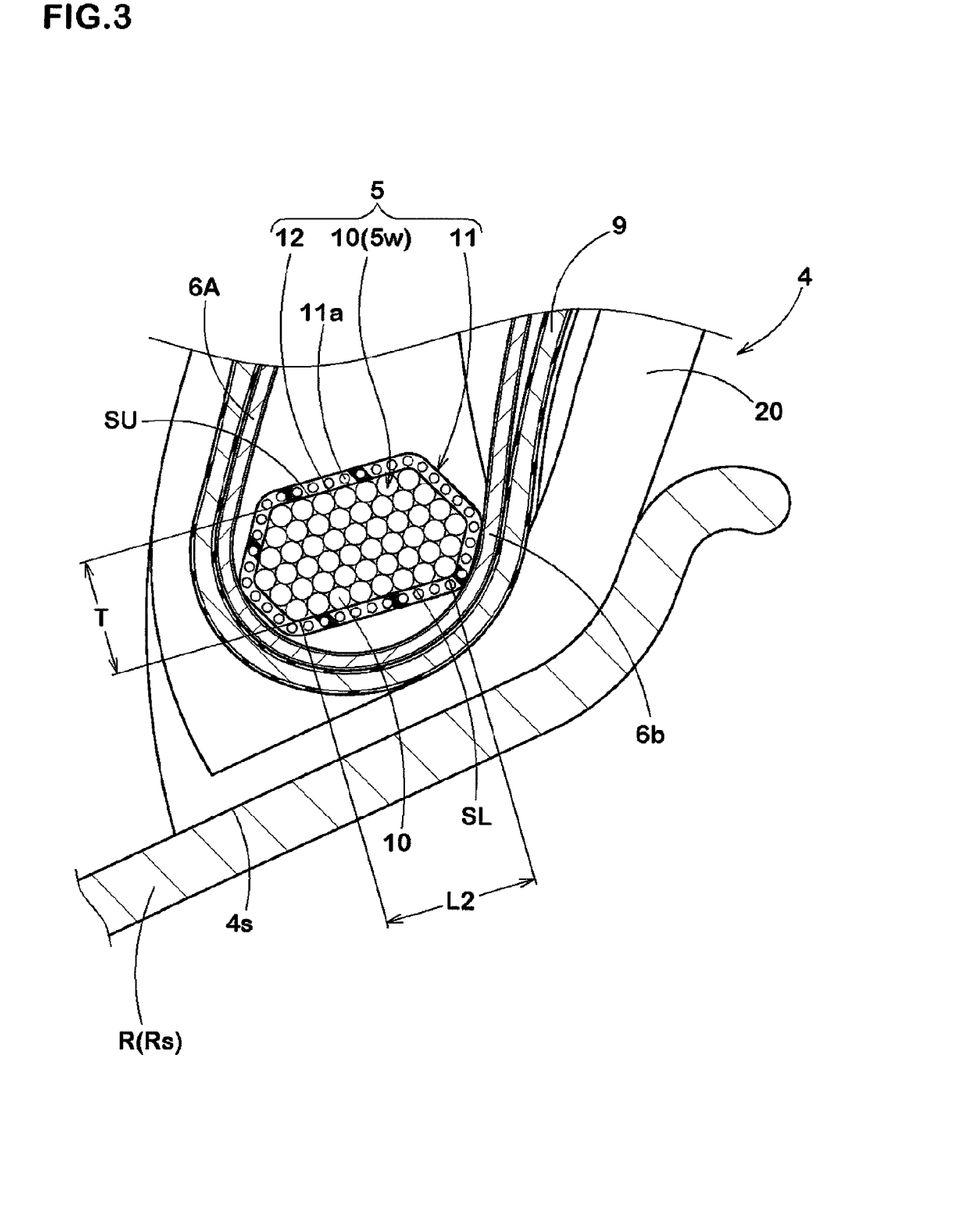
FIG. 3 is an enlarged cross sectional view of the bead core thereof.

Further, each of the bead portions 4 is, as shown in FIGS. 2 and 3, provided with a bead reinforcing cord layer 9 in order to increase the bending rigidity of the bead portion 4.

The bead reinforcing cord layer 9 is composed of a single ply of steel cords inclined at an angle of from 10 to 60 degrees with respect to the tire circumferential direction. The bead reinforcing cord layer 9 comprises: a base portion 9a positioned radially inside the bead core 5; an axially inner portion 9i extending radially outwardly from the base portion 9a along the axially inner surface of the carcass main portion 6a; and an axially outer portion 9o extending radially outwardly from the base portion 9a along the axially outer surface of the carcass turned up portion 6b, thereby having a U-shaped cross section.

Furthermore, each of the bead portions 4 is, as shown in FIG. 2, provided with a clinch rubber layer 20 so as to cover an area contacting with a wheel rim when the tire is mounted thereon. Thus, the clinch rubber layer 20 has: a base part 20a extending from the bead toe to the bead heel so as to define the bead bottom surface 4s; an axially outer part 20b extending radially outwardly from the bead heel so as to define an axially outer surface of the bead portion contacting with a flange Rj of the wheel rim; and an axially inner part extending radially outwardly from the bead toe so as to define an axially inner surface of the bead portion.

Preferably, the hardness Hs3 of the clinch rubber layer 20 is more than the hardness Hs2 of the radially outer apex 8b and less than the hardness Hs1 of the radially inner apex 8a.

The above-mentioned bead core 5 is, as shown in FIGS. 3 and 4, composed of: a bead core main 10 made of a large number of windings of a steel wire 5w; a rubber coating 12 penetrating into the bead core main 10 and coating the surface of the steel wire 5w; and a bead core wrapping layer 11 surrounding the bead core main 10.

In the tire meridian section including the tire rotational axis, the bead core main 10 in this example has a hexagonal cross-sectional shape which is elongated in a direction substantially parallel with the bead bottom surface 4s, and has: a radially inner surface SL substantially flat and substantially parallel with the bead seat Rs of the wheel rim when the tire is mounted; a radially outer surface SU substantially parallel with the radially inner surface SL; an axially outer V-shaped bent surface; and an axially inner V-shaped bent surface of which bent point is the axially innermost end of the bead core main 10.

Preferably, the length L2 of the radially inner surface SL is more than 1.0 times, more preferably not less than 1.6 times the thickness T of the bead core main measured between the radially inner surface SL and radially outer surface SU. Therefore, the bead core main 10 can provide a tightening effect on a relatively wide range across the bead base, and further, the bead core main 10 can exert a greater resistance against a torsional deformation. Thus, the bead portions are fastened on the bead seats Rs of the wheel rim.

The bead core wrapping layer 11 is, as shown in FIGS. 3 and 4, composed of at least one ply 11A of parallel organic fiber cords 11a rubberized with a topping rubber Tg2.

The hardness Ht2 of the topping rubber Tg2 is set in a range of not less than 70 degrees, preferably not less than 72 degrees, but not more than 90 degrees, preferably not more than 88 degrees.

For the organic fiber cords 11a of the bead core wrapping layer 11, nylon fiber cords, rayon fiber cords, polyester fiber cords, aromatic polyamide fiber cords, vinyl on fiber cords and the like can be used.

The fineness D1 of the organic fiber cord 11a is set in a range of not less than 940 dtex, preferably not less than 1670 dtex, but not more than 4200 dtex, preferably not more than 3960 dtex.

Figure 5:
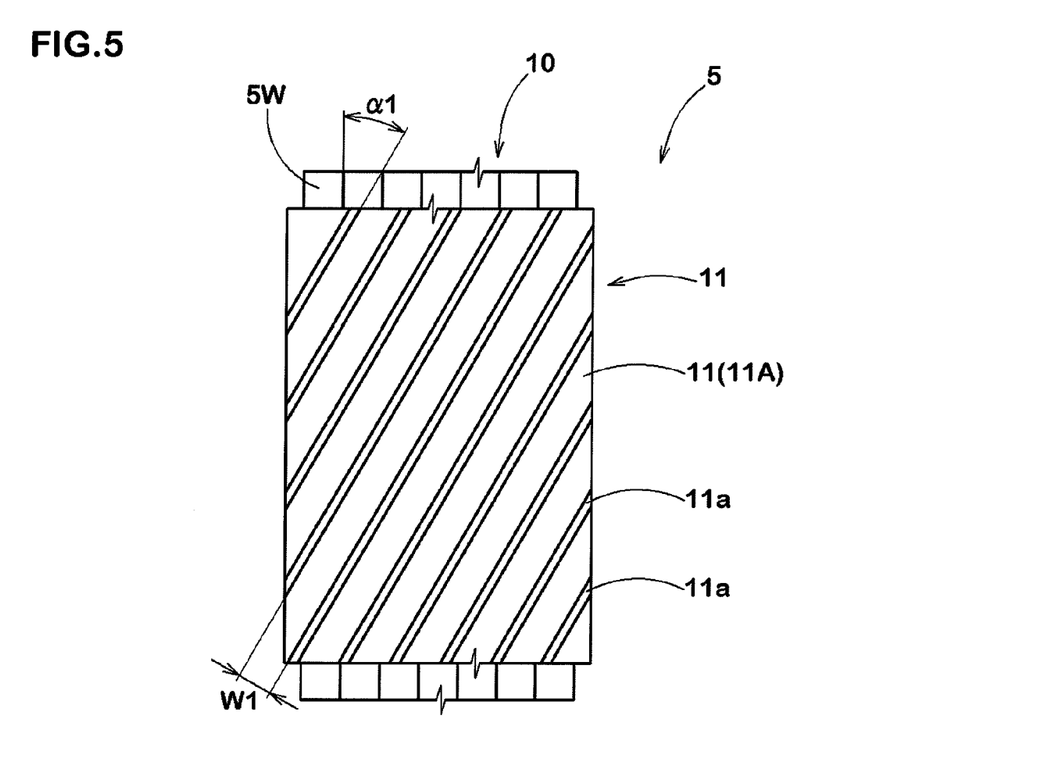
FIG. 5 is a schematic plan view of the bead core showing the cord arrangement of the bead core wrapping layer thereof.

As shown in FIG. 5, the distances W1 between the organic fiber cords 11a are set in a range of not less than 0.3 mm, preferably not less than 0.4 mm, but not more than 1.4 mm, preferably not more than 1.3 mm.

The organic fiber cords 11a are inclined at an angle $\alpha 1$ in a range of not less than 20 degrees, preferably not less than 25 degrees, but not more than 70 degrees, preferably not more than 65 degrees with respect to the tire circumferential direction.

The above-mentioned rubber coating 12 of the bead core main 10 has a hardness Hb which is set in a range of not less than 78 degrees, but not more than 90 degrees in order to prevent breakage of the carcass cords by preventing deformation of the bead core main 10.

It is preferable that the hardness Ht1 of the topping rubber Tg1 of the carcass ply 6A, the hardness Ht2 of the topping rubber Tg2 of the bead core wrapping layer 11, and the hardness Hb of the rubber coating 12 of the bead core main 10 satisfy the following relationship (1): Hb>Ht2>Ht1
In this way, by increasing the hardness towards the center of the bead core 5, the strength around the bead core 5 is optimized and the durability can be improved.

The minimum distance L1 between the carcass cord 6c and the axially innermost steel wire 5w1 (or the axially innermost winding) of the bead core main 10 is set in a range of not less than 0.8 mm, preferably not less than 1.0 mm, but not more than 3.0 mm, preferably not more than 2.5 mm.
If the minimum distance L1 is more than 3.0 mm, due to heat generation during running, there is a possibility that a separation failure occurs between the carcass cords 6C and the bead core main 10. If the minimum distance L1 is less than 0.8 mm, there is a possibility that the carcass cords 6c contact with the steel wire 5w.

By employing the above-described structure, the minimum distance L1 can be maintained even under extremely severe service conditions, and the direct contact between the steel carcass cords and the steel wire of the bead core can be avoided.

If the hardness Ht2 of the topping rubber Tg2 of the bead core wrapping layer 11 is less than 70 degrees, there is a possibility that the carcass cords 6c sink into the bead core wrapping layer 11 and contact with the steel wire 5w of the bead core 5, and as a result the carcass cords are worn down. If the hardness Ht2 is more than 90 degrees, there is a possibility of rubber burn during kneading of the topping rubber materials, and as a result, the strength and quality of the bead core wrapping layer 11 are decreased.

If the fineness D1 of each organic fiber cord 11a is less than 940 dtex, it becomes difficult to maintain the minimum distance L1, and breakage of the carcass cord is liable to occur. If the fineness D1 is more than 4200 dtex, it becomes difficult to fit the bead core wrapping layer 11 onto the bead core main 10, and as a result, it becomes difficult to maintain the ordered arrangement of the windings of the steel wire 5w.

If the distances w1 between organic fiber cords 11a are less than 0.3 mm, the coupling between the organic fiber cords 11a by the topping rubber Tg2 decreases, and there is a possibility that the carcass cords 6c sink into the bead core wrapping layer 11 and contact with the steel wire 5w. If the distances W1 are more than 1.4 mm, there is a possibility that the carcass cords 6c sink into the bead core wrapping layer 11 and contact with the steel wire 5w.

If the inclination angle α1 of the organic fiber cords 11a is less than 20 degrees, there is a possibility that the organic fiber cords 11a sink between the windings of the steel wire 5w. If the inclination angle α1 is more than 70 degrees, there is a possibility that the organic fiber cords 11a sink between the carcass cords. In either case, the distance between the carcass cords 6c and the steel wire 5w is decreased, therefore, there is a possibility that the carcass cords 6c contact with the steel wire 5w.

Figure 6:
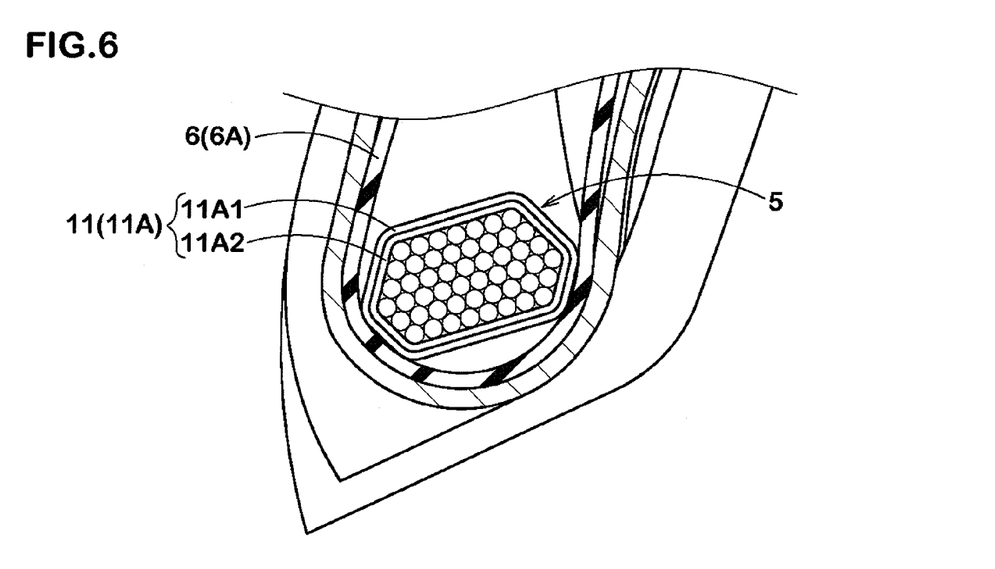
FIG. 6 is a schematic cross sectional view showing another example of the bead core wrapping layer.

FIG. 6 shows another example of the above-mentioned bead core wrapping layer 11. In this example, in order to adjust (increase) the above-mentioned minimum distance L1 between the carcass cords 6c and the axially innermost winding of the steel wire 5w1 of the bead core main 10, two plies 11A1 and 11A2 are wound as the bead core wrapping layer 11 around the bead core main 10.

In this case, it is possible to incline the parallel organic fiber cords 11a of one ply 1141 towards the same direction as the parallel organic fiber cords 11a of the other ply 11A2 with respect to the tire circumferential direction.

Figure 7:
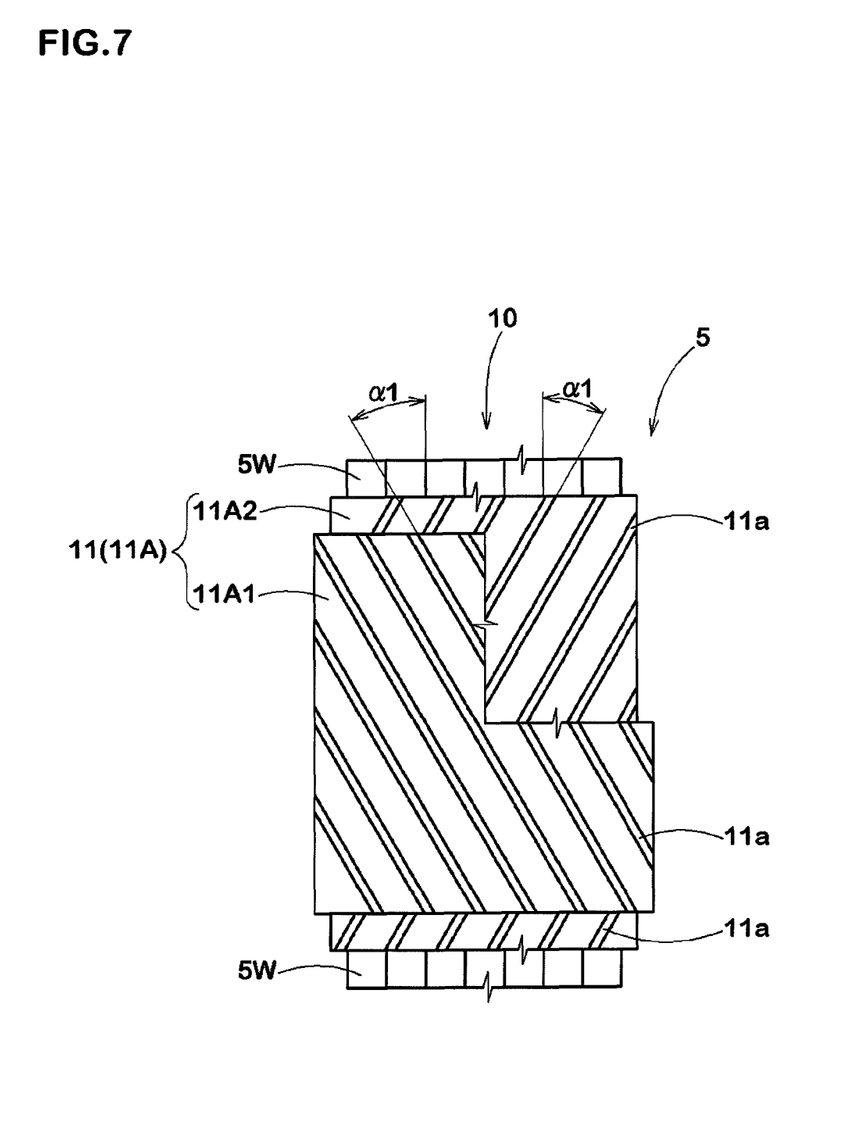
FIG. 7 is a schematic plan view of the bead core shown in FIG. 6 showing the cord arrangement of the bead core wrapping layer.

But, it is preferred that, as shown in FIG. 7, the parallel organic fiber cords 11a of one ply 11A1 are inclined towards the opposite direction to the parallel organic fiber cords 11a of the other ply 11A2 with respect to the tire circumferential direction so that the plies cross each other. In either case, it is preferable that the inclination angle α1 of the parallel organic fiber cords 11a of one ply 11A1 and the inclination angle α1 of the parallel organic fiber cords 11a of the other ply 11A2 with respect to the tire circumferential direction have same absolute values within the above-mentioned range. Therefore, the carcass cords 6c are effectively prevented from sinking into the bead core wrapping layer 11. Accordingly, direct contact between the carcass cords 6c and steel wire 5w1 can be prevented, and the breakage of the carcass cords is prevented.

Comparison Tests

Heavy duty pneumatic tires of size 385/65R22.5 having the structure shown in FIG. 1 and specifications shown in Table 1 were prepared and tested for the bead durability.

Except for the specifications shown in Table 1, all of the tires had substantially same specifications and same structure.

Indoor Durability Test:

Using a tire test drum of 1707 mm diameter, each test tire mounted on a wheel rim of size 22.5×11.75 and inflated to 1100 kPa was run until the tire was broken under the following accelerated conditions, and the running time was measured.

The minimum acceptable running time is 450 hours.
  Vertical load (tire load): 94 kN
  Running speed: 20 km/h
  Slip angle: 0 degree
  Camber angle: 0 degree
Then, each tire was disassembled, and checked for damages. The test results are shown in Table 1, wherein
"CBU" means that breakage of the carcass cords was found;
"PTL" means that separation of the carcass cords from the surrounding rubber was found at the radially outer edge of the carcass ply turned up portion; and
"PBU" means that the carcass ply was slipped off from the bead core.

TABLE 1

| Tire | Ref. 1 | Ref. 2 | Ref. 3 | Ref. 4 | Ref. 5 | Ref. 6 | Ref. 7 | Ref. 8 | Ex. 1 |
|---|---|---|---|---|---|---|---|---|---|
| Minimum distance L1 (mm) | 0.4 | 3.4 | 1.0 | 1.0 | 1.0 | 1.0 | 1.0 | 1.0 | 1.0 |
| Bead core wrapping layer | | | | | | | | | |
| number of ply | 1 | 3 | 1 | 1 | 1 | 1 | 1 | 1 | 1 |
| ply arrangement | — | cross | — | — | — | — | — | — | — |
| cord angle α1 (deg.) | 45 | 45 | 45 | 45 | 80 | 45 | 45 | 45 | 45 |
| distance W1 (mm) | 1.15 | 1.15 | 0.38 | 1.56 | 1.15 | 1.15 | 1.15 | 1.15 | 1.15 |
| cord count/5 cm | 30 | 30 | 60 | 24 | 30 | 30 | 30 | 30 | 30 |
| cord material | nylon | nylon | nylon | nylon | nylon | nylon | nylon | nylon | nylon |

TABLE 1-continued

| | | | | | | | | | |
|---|---|---|---|---|---|---|---|---|---|
| cord structure | 940 dtex/2 | 940 dtex/2 | 490 dtex | 940 dtex/2 | 940 dtex/2 | 940 dtex/2 | 940 dtex/2 | 940 dtex/2 | 940 dtex/2 |
| fineness D1 (dtex) | 1880 | 1880 | 490 | 1880 | 1880 | 1880 | 1880 | 1880 | 1880 |
| Hardness | | | | | | | | | |
| Carcass ply's topping rubber Ht1 (deg.) | 70 | 69 | 70 | 68 | 70 | 64 | 67 | 68 | 74 |
| Bead core wrapping layer's topping rubber Ht2 (deg.) | 73 | 74 | 73 | 72 | 73 | 71 | 67 | 71 | 70 |
| Rubber coating Hb (deg.) | 79 | 80 | 79 | 79 | 79 | 80 | 79 | 74 | 78 |
| Indoor durability test | | | | | | | | | |
| Running time (hrs.) | 231 | 319 | 341 | 268 | 211 | 347 | 288 | 269 | 452 |
| Type of damage | CBU | PBU | CBU | CBU | CBU | CBU | CBU | CBU | PTL |

| Tire | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|
| Minimum distance L1 (mm) | 1.0 | 1.4 | 0.8 | 1.8 | 1.7 | 1.8 | 1.8 | 1.8 | 1.8 | 1.8 |
| Bead core wrapping layer | | | | | | | | | | |
| number of ply | 1 | 1 | 1 | 2 | 1 | 2 | 2 | 2 | 2 | 2 |
| ply arrangement | — | — | — | cross | parallel | cross | cross | cross | cross | cross |
| cord angle α1 (deg.) | 45 | 45 | 45 | 45 | 45 | 45 | 45 | 45 | 45 | 45 |
| distance W1 (mm) | 1.15 | 1.4 | 0.31 | 1.15 | 1.15 | 1.28 | 1.19 | 0.99 | 0.94 | 0.31 |
| cord count/5 cm | 30 | 26 | 60 | 30 | 30 | 30 | 30 | 30 | 30 | 60 |
| cord material | nylon | nylon | nylon | nylon | nylon | nylon | nylon | nylon | nylon | nylon |
| cord structure | 940 dtex/2 | 940 dtex/2 | 940 dtex/2 | 940 dtex/2 | 940 dtex/2 | 1100 dtex | 1670 dtex | 3340 dtex | 4200 dtex | 940 dtex/2 |
| fineness D1 (dtex) | 1880 | 1880 | 1880 | 1880 | 1880 | 1100 | 1670 | 3340 | 4200 | 1880 |
| Hardness | | | | | | | | | | |
| Carcass ply's topping rubber Ht1 (deg.) | 68 | 70 | 69 | 69 | 70 | 69 | 69 | 69 | 69 | 69 |
| Bead core wrapping layer's topping rubber Ht2 (deg.) | 72 | 71 | 70 | 72 | 72 | 72 | 72 | 72 | 72 | 72 |
| Rubber coating Hb (deg.) | 79 | 78 | 79 | 79 | 78 | 79 | 79 | 79 | 79 | 79 |
| Indoor durability test | | | | | | | | | | |
| Running time (hrs.) | 480 | 496 | 487 | 521 | 508 | 509 | 514 | 543 | 576 | 528 |
| Type of damage | PTL | PTL | PTL | PTL | PTL | PTL | PTL | PTL | PTL | PTL |

| Tire | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|
| Minimum distance L1 (mm) | 1.8 | 1.8 | 1.8 | 1.8 | 1.8 | 1.8 | 1.8 | 1.8 | 1.8 |
| Bead core wrapping layer | | | | | | | | | |
| number of ply | 2 | 2 | 2 | 2 | 2 | 2 | 2 | 1 | 1 |
| ply arrangement | cross | cross | cross | cross | cross | cross | cross | — | — |
| cord angle α1 (deg.) | 45 | 45 | 45 | 20 | 25 | 65 | 70 | 45 | 45 |
| distance W1 (mm) | 0.48 | 1.27 | 1.4 | 1.15 | 1.15 | 1.15 | 1.15 | 1.15 | 1.15 |
| cord count/5 cm | 50 | 28 | 26 | 30 | 30 | 30 | 30 | 30 | 30 |
| cord material | nylon | nylon | nylon | nylon | nylon | nylon | nylon | nylon | nylon |
| cord structure | 940 dtex/2 | 940 dtex/2 | 940 dtex/2 | 940 dtex/2 | 940 dtex/2 | 1880 dtex | 1880 dtex | 940 dtex | 1880 dtex |
| fineness D1 (dtex) | 1880 | 1880 | 1880 | 1880 | 1880 | 1880 | 1880 | 940 | 1880 |
| Hardness | | | | | | | | | |
| Carcass ply's topping rubber Ht1 (deg.) | 69 | 69 | 69 | 69 | 69 | 69 | 69 | 69 | 72 |
| Bead core wrapping layer's topping rubber Ht2 (deg.) | 72 | 72 | 72 | 72 | 72 | 72 | 72 | 72 | 72 |
| Rubber coating Hb (deg.) | 79 | 79 | 79 | 79 | 79 | 79 | 79 | 79 | 72 |
| Indoor durability test | | | | | | | | | |
| Running time (hrs.) | 516 | 509 | 501 | 556 | 532 | 526 | 509 | 498 | 507 |
| Type of damage | PTL | PTL | CBU | PTL | PTL | PTL | CBU | PTL | PTL |

Reference Signs List

| | |
|---|---|
| 1 | heavy duty pneumatic tire |
| 2 | tread portion |
| 3 | sidewall portion |
| 4 | bead portion |
| 5 | bead core |
| 5w | steel wire of bead core |
| 5w1 | axially innermost (winding of) steel wire |
| 6 | carcass |
| 6A | carcass ply |
| 6a | main portion of carcass ply |
| 6b | turned up portion of carcass ply |
| 6c | carcass cord |
| 10 | bead core main |
| 11 | bead core wrapping layer |
| 11a | organic fiber cord of bead core wrapping layer |
| 12 | rubber coating for bead core main |
| Tg1 | topping rubber of carcass ply |
| Tg2 | topping rubber of bead core wrapping layer |

The invention claimed is:

1. A heavy duty pneumatic tire comprising
a tread portion,
a pair of sidewall portions,
a pair of bead portions each with a bead core therein, and
a carcass ply of steel cords extending between the bead portions and turned up around the bead core in each said bead portion from the inside to the outside of the tire so as to form a pair of turned up portions and a main portion therebetween,
wherein
the steel cords of the carcass ply are rubberized with a topping rubber having a hardness Ht1 of not less than 68 degrees but not more than 90 degrees,
the bead core is composed of
a bead core main made of windings of a steel wire,
a rubber coating penetrating into the bead core main and having a hardness Hb of from 78 to 90 degrees, and
a bead core wrapping layer surrounding the bead core main and composed of at least one ply of parallel organic fiber cords rubberized with a topping rubber having a hardness Ht2 of from 70 to 90 degrees, wherein
the fineness of each of said parallel organic fiber cords is in a range of from 940 to 4200 dtex,
the distances between said parallel organic fiber cords is in a range of from 0.3 to 1.4 mm,
said parallel organic fiber cords are inclined at an angle α1 in a range of from 20 to 70 degrees with respect to the tire circumferential direction, and
the hardness Ht2 of the topping rubber of the bead core wrapping layer is greater than the hardness Ht1 of the topping rubber of the carcass ply, but less than the hardness Hb of the rubber coating of the bead core,
a minimum distance between the carcass cords and the axially innermost winding of the steel wire of the bead core main is in a range of from 0.8 to 3.0 mm, and
said at least one ply is two plies in which, with respect to the tire circumferential direction, the organic fiber cords of one ply are inclined to one direction and the organic fiber cords of the other ply are inclined to the opposite direction thereto.

2. The heavy duty pneumatic tire according to claim 1, wherein
the inclination angle of the organic fiber cords of one ply and the inclination angle of the organic fiber cords of the other ply with respect to the tire circumferential direction are the same absolute values.

3. The heavy duty pneumatic tire according to claim 1, wherein
the bead portions are each provided between the main portion and turned up portion of the carcass ply with a bead apex extending radially outwardly from the bead core in a tapered manner,
the bead apex is composed of a radially inner apex made of a hard rubber having a hardness Hs1 of from 80 to 95 degrees, and a radially outer apex made of a rubber softer than the inner apex and having a hardness Hs2 of from 50 to 65 degrees,
the bead portions are each provided with a bead reinforcing cord layer composed of a single ply of steel cords inclined at an angle of from 10 to 60 degrees with respect to the tire circumferential direction,
the bead reinforcing cord layer has a base portion positioned radially inside the bead core, an axially inner portion extending radially outwardly from the base portion along the axially inner surface of the carcass main portion, and an axially outer portion extending radially outwardly from the base portion along the axially outer surface of the carcass turned up portion, and
the carcass turned up portion extends while abutting the radially outer apex and terminates on the axially outside thereof.

* * * * *